Sept. 29, 1925.
S. E. WHITE
SNUBBER FOR MOTOR VEHICLES
Filed Feb. 9, 1924
1,555,343
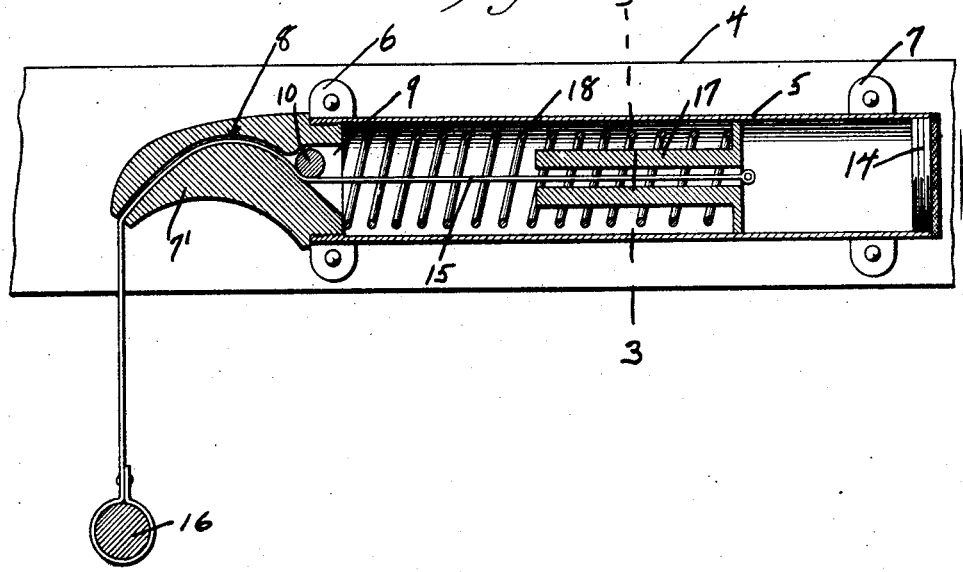
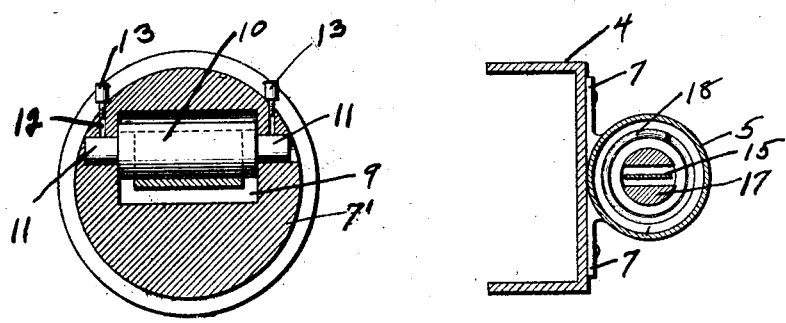
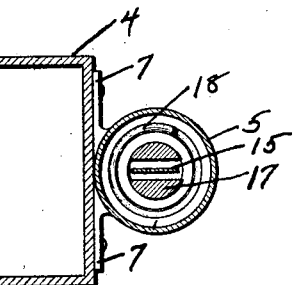
Inventor
S. E. White,
By Bernard F. Garner,
Attorney Patented Sept. 29, 1925.

1,555,343

UNITED STATES PATENT OFFICE.

SANFORD E. WHITE, OF OCEANPARK, CALIFORNIA.

SNUBBER FOR MOTOR VEHICLES.

Application filed February 9, 1924. Serial No. 691,701.

*To all whom it may concern:*

Be it known that I, SANFORD E. WHITE, a citizen of the United States, residing at Oceanpark, in the county of Los Angeles and State of California, have invented certain new and useful Improvements in Snubbers for Motor Vehicles, of which the following is a specification.

The present invention consists of a snubber for motor vehicles and is characterized by the advantages common to devices of this character in conjunction with which a very simple, durable and effective device is provided which may be applied to a vehicle in a facile and expeditious manner.

Another object of the invention is to provide a readily accessible snubber structure which may be adjusted without difficulty and is formed to increase the longevity of the snubber belt.

Other objects of the invention will be apparent from the following description of the present preferred form of the invention taken in connection with the accompanying drawings wherein:—

Fig. 1 is a longitudinal sectional view of a snubber constructed in accordance with this invention illustrating its application;

Fig. 2 is a vertical sectional view of the snubber per se showing to advantage the roller and belt employed therein; and Fig. 3 is a vertical sectional view taken on the line 3—3 of Fig. 1.

In the drawings in order to illustrate the application of this invention, a portion 4 of a vehicle chassis is shown which may be of standard construction. The snubber constructed in accordance with the present invention is applied to the chassis 4 and consists of a cylindrical body 5 which has ears 6 formed thereon at one end of the body and ears 7 formed thereon in proximity to the other end of the body. These ears are fixedly secured to the vehicle chassis 4.

One end of the body 5 is equipped with a screwthreaded plug 7' through which an arcuate slot 8 extends. The inner end of the slot is enlarged to provide a recess 9 in which a roller 10 is revolubly mounted. The ends of the roller 10 are reduced to provide spindles 11 which may be lubricated through ways 12 from lubricant cups 13. The opposite end of the body 5 has a screwthreaded cap 14 mounted therein.

A snubber belt 15 is mounted for movement through the snubber body 5 and has one end thereof engaged with an axle 16 of the vehicle. The opposite end of the belt is engaged with a core 17 slidably mounted in the body 5. The diameter of the core is relatively smaller than the diameter of the inner periphery of the body 5 and has an annulus formed on one end thereof the periphery of which snugly engages the inner periphery of the body 5. A slot extends longitudinally through the core 7 and is adapted to receive the belt 15. The intermediate portion of the belt is trained beneath the roller 10 and through the arcuate slot 8 in the plug 7' as illustrated in Fig. 1.

In order to normally hold the belt 15 under tension, a spring 18 is provided one end of which is convoluted around the body of the core 17 and the opposite end engaged with the inner face of the plug 7'. Since one end of the belt 15 is engaged with the axle 16 and the opposite end is engaged with the core 17, the spring 18 at all times is exerting pressure upon the core so as to force the latter toward the cap 14.

In use of this device, it will be apparent that inequalities in the road of travel will cause the axle 16 to be urged upwardly, consequently, permitting the spring 18 to further expand and drawing the belt 15 taut. Shock, due to rebound of the vehicle springs, will be snubbed by reason of the fact that the axle 16 will not be permitted to gravitate suddenly since the spring 18 which was expanded under upward movement of the axle 16 is now being contracted by the downward movement of the axle.

It is apparent that by making the plug 7' and cap 14 detachable that the device may be quickly assembled or dissembled and defects in any parts of the snubber remedied. The peculiar arrangement of the belt through the plug 7' augments the snubbing characteristics of this device. Adherence of the belt to the plug 7' or premature destruction of the same by contact with rough edges, etc., is eliminated by employing the roller 10, the latter being assured free movement at all times by the lubricating arrangement herein employed. Furthermore, this device is of very simple construction and can be expeditiously applied to practically any standard type of motor vehicle now in use at a relatively small cost.

It is of course to be understood that various changes may be made in this device especially in the details of construction, proportion and arrangements of parts within the scope of the appended claims.

What is claimed is:—

1. In combination with a vehicle embodying a chassis and axle, a snubber embodying a tubular cylindrical body portion engaged with the chassis and arranged in a horizontal plane, a plug detachably mounted in one end of the body and provided with a slot therethrough of arcuate configuration the apex of which lies appreciably above the longitudinal center of said cylindrical body, an elastic element mounted in said body and a belt one end of which is engaged with said element and the opposite end trained through said slot and engaged with the vehicle axle.

2. A snubber for vehicles including a snubber body engageable with the chassis of a vehicle, a belt one end of which is yieldingly engaged with the said body and the opposite end engaged with an axle of the vehicle, a plug mounted in said snubber body through which an intermediate part of said belt extends, and a roller mounted in said plug beneath which said belt passes.

3. A snubber for motor vehicles including a snubber body engageable with the vehicle, a plug detachably mounted in one end of said body and provided with an arcuate slot, a roller mounted in said slot, a belt one end of which is yieldingly anchored in said body and the opposite end engaged with an axle of the vehicle, the intermediate portion of said belt being trained through said slot and beneath said roller, and a cap detachably mounted in the opposite end of said body.

4. In combination with a vehicle embodying a chassis and axle, a snubber including a tubular body secured to said chassis, a plug detachably mounted in one end of said body and provided with an arcuate slot issuing into a recess at one end, a roller mounted in said recess, and a belt trained through the slot in said plug and beneath the roller, one end of said belt being yieldingly anchored in said body and the opposite end secured to said axle.

In testimony whereof I affix my name.

SANFORD E. WHITE.